United States Patent
Ahn et al.

(10) Patent No.: US 11,697,369 B2
(45) Date of Patent: Jul. 11, 2023

(54) LIDAR INTEGRATED LAMP DEVICE FOR VEHICLE

(71) Applicants: Hyundai Motor Company, Seoul (KR); Kia Motors Corporation, Seoul (KR)

(72) Inventors: Byoung Suk Ahn, Gwacheon-si (KR); Jung Wook Lim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 906 days.

(21) Appl. No.: 16/586,044

(22) Filed: Sep. 27, 2019

(65) Prior Publication Data

US 2020/0339030 A1 Oct. 29, 2020

(30) Foreign Application Priority Data

Apr. 26, 2019 (KR) .................. 10-2019-0049312

(51) Int. Cl.
*B60Q 1/00* (2006.01)
*G01S 7/481* (2006.01)
*G01S 17/931* (2020.01)

(52) U.S. Cl.
CPC .......... *B60Q 1/0023* (2013.01); *G01S 7/4812* (2013.01); *G01S 7/4813* (2013.01); *G01S 17/931* (2020.01)

(58) Field of Classification Search
CPC ... B60Q 1/0023; G01S 17/931; G01S 7/4812; G01S 7/4813
See application file for complete search history.

(56) References Cited

U.S. PATENT DOCUMENTS

| | | | | |
|---|---|---|---|---|
| 3,447,129 | A | * | 5/1969 | Birmingham et al. ... B64F 1/20 340/955 |
| 5,620,246 | A | * | 4/1997 | Uehan .................... F21S 41/335 362/520 |
| 9,285,477 | B1 | | 3/2016 | Smith et al. |
| 2005/0201096 | A1 | * | 9/2005 | Terui ...................... G01S 7/4812 362/276 |
| 2005/0286101 | A1 | * | 12/2005 | Garner ...................... G03H 1/02 359/9 |
| 2017/0113599 | A1 | * | 4/2017 | Park .................... G02B 26/0833 |
| 2018/0180247 | A1 | * | 6/2018 | Park ...................... F21S 41/285 |
| 2018/0180880 | A1 | * | 6/2018 | Katagiri ............. G02B 27/0101 |
| 2020/0025893 | A1 | * | 1/2020 | Jang ........................ G01S 7/4817 |
| 2020/0096634 | A1 | * | 3/2020 | Droz ...................... G01S 7/4818 |

FOREIGN PATENT DOCUMENTS

JP 2014075331 A * 4/2014 ............. F21S 48/00
KR 10-2009-0096994 A 9/2009

* cited by examiner

*Primary Examiner* — Dale W Hilgendorf
*Assistant Examiner* — Frank T Glenn, III
(74) *Attorney, Agent, or Firm* — Morgan, Lewis & Bockius LLP

(57) ABSTRACT

Disclosed is a Light Detection and Ranging (LiDAR)-integrated lamp device configured for a vehicle. In the included LiDAR-integrated lamp device, the position at which a head lamp is applied and the position at which a LiDAR is applied are identical and then, a reduction in layout is achieved. Furthermore, through sharing of constituent elements, the number of constituent elements is reduced and then, manufacturing costs are reduced.

15 Claims, 7 Drawing Sheets

LIDAR INTEGRATED LAMP DEVICE FOR VEHICLE

CROSS-REFERENCE TO RELATED APPLICATION

The present application claims priority to Korean Patent Application No. 10-2019-0049312, filed on Apr. 26, 2019 in the Korean Intellectual Property Office, the entire contents of which is incorporated herein for all purposes by this reference.

BACKGROUND OF THE INVENTION

Field of the Invention

The present invention relates to a Light Detection and Ranging (LiDAR)-integrated lamp device for a vehicle in which a head lamp and a LiDAR achieve functions thereof in a single space, respectively.

Description of Related Art

Generally, vehicles are provided with lighting devices having a purpose of facilitating the driver to clearly view an object disposed in front in a running direction while driving at night and a use purpose of informing other vehicles or other road users of the running state of the driver's vehicle. Head lamps, which are also referred to as "headlights", are lighting lamps having a function of lighting a front advance route, along which a vehicle will travel.

Meanwhile, in recent years, a LiDAR has been provided in an autonomous vehicle to realize an autonomous function. Such a LiDAR is configured to detect the distance between a vehicle and a target through emission of the laser light by measuring the time taken for laser light to be received by a sensor after being transmitted to the target.

Such a LiDAR is mounted at a position different from that of a head lamp of the vehicle, even though the positions are similar and then, it may be necessary to secure different installation spaces for the head lamp and the LiDAR. Since the head lamp and the LiDAR may be mounted in different spaces, there may be problems of an increase in installation space and an increase in the number of constituent elements. Furthermore, when the optimal installation positions of the head lamp and the LiDAR are identical, there may be a problem in that the position of a selected one of the head lamp and the LiDAR may be changed in spite of degradation of the function of the selected device.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a Light Detection and Ranging (LiDAR)-integrated lamp device configured for a vehicle in which the position at which a head lamp is applied and the position at which a LiDAR is applied are identical, being configured for achieving a reduction in layout.

In accordance with an aspect of the present invention, the above and other objects may be accomplished by the provision of a LiDAR-integrated lamp device configured for a vehicle including a first light source of emitting light for beam patterns; a second light source spaced from the first light source, to emit light for LiDAR sensing; a reflection unit of receiving the light for beam patterns from the first light source and the light for LiDAR sensing from the second light source, and configured of varying reflection angles for the light for beam patterns and the light for LiDAR sensing, changing travel paths of the light for beam patterns and the light for LiDAR sensing; a first reflection mirror of receiving the light for beam patterns reflected from the reflection unit, and changing the light for beam patterns into visible light while reflecting the light for beam patterns, emitting the visible light for beam patterns outwards of the vehicle; a second reflection mirror of receiving the light for LiDAR sensing reflected from the reflection unit, and reflecting the light for LiDAR sensing, thereby emitting the reflected light for LiDAR sensing outwards of the vehicle; a first optical system of projecting the light for beam patterns reflected through the first reflection mirror outwards of the vehicle; and a second optical system for diffusing the light for LiDAR sensing reflected through the second reflection mirror outwards of the vehicle.

The LiDAR-integrated lamp device may further include a light receiving unit of receiving light for LiDAR sensing reflected and returned after being emitted outwards of the vehicle, and changing the received light into an electrical signal.

Plural opaque barriers may be mounted at a cross-section of the first reflection mirror, to extend linearly, while being spaced from one another.

A diffusion unit may be mounted between the reflection unit and the first reflection mirror, to diffuse the light for beam patterns.

The reflection unit may be a digital micro-mirror device (DMD) including a plurality of micro-mirrors each configured to vary an angle thereof through ON/OFF switching thereof according to a drive signal input thereto, changing a travel path of light incident thereupon.

The first light source and the second light source may be mounted at one side of the reflection unit. The second light source may be spaced from a first connecting line connecting the first light source and the reflection unit in an upward or downward direction thereof.

The reflection unit may be inclinedly mounted to guide the light for beam patterns and the light for LiDAR sensing incident thereupon to travel after being reflected upwards or downwards. The first reflection mirror and the first optical system may be mounted above the second reflection mirror and the second optical system when the second light source is mounted above the first light source.

The reflection unit may have a central axis inclined at a first angle from a virtual perpendicular line, and an inclination direction of the central axis is set such that the light for beam patterns and the light for LiDAR sensing travel in a direction opposite to a direction in which the light for beam patterns and the light for LiDAR sensing are emitted outwards of the vehicle.

The first reflection mirror and the first optical system may be mounted on a line extending in a direction in which the light for beam patterns is emitted outwards of the vehicle. The first reflection mirror may be mounted on an optical axis extending in a direction in which the light for beam patterns emitted from the first light source travels after being reflected by the reflection unit, and may be inclinedly disposed such that the light for beam patterns incident thereupon travels toward the first optical system.

The first reflection mirror may be perpendicularly spaced from the central axis of the reflection unit while being is inclined at an angle equal to ½ of the first angle with respect to a first disposition line of connecting the first reflection mirror and the first optical system.

The second light source may be spaced from a first connecting line connecting the first light source and the reflection unit in an upward direction by a second angle.

The second reflection mirror and the second optical system may be disposed on a line extending in a direction in which the light for LiDAR sensing is emitted outwards of the vehicle. The second reflection mirror may be disposed on an optical axis extending in a direction in which the light for LiDAR sensing emitted from the second light source travels after being reflected by the reflection unit, and may be inclinedly disposed such that the light for LiDAR sensing incident thereupon travels toward the second optical system.

The second reflection mirror may include a first reflector mounted to be downwardly spaced apart by the second angle from an optical axis of the light for beam patterns traveling after being reflected by the reflection unit while being inclined at an angle equal to ½ of the second angle with respect to the light for LiDAR sensing traveling after being reflected by the reflection unit; and a second reflector mounted to receive the light for LiDAR sensing reflected by the first reflector while being inclined at an angle equal to ½ of the first angle with respect to a second disposition line of the second reflection mirror and the second optical system.

The first reflector may be formed to have a surface curved with respect to the central axis of the reflection unit.

The second optical system may include a first diffusion lens for horizontally diffusing the light for LiDAR sensing traveling after being reflected by the second reflection mirror, and a second diffusion lens for vertically diffusing the light for LiDAR sensing horizontally diffused by the first diffusion lens.

In the LiDAR-integrated lamp device having the above-described configuration, the position at which a head lamp is applied and the position at which a LiDAR is applied are identical. Accordingly, there may be an effect configured for achieving a reduction in layout. Furthermore, through sharing of constituent elements, it may be possible to reduce the number of constituent elements and then, manufacturing costs may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
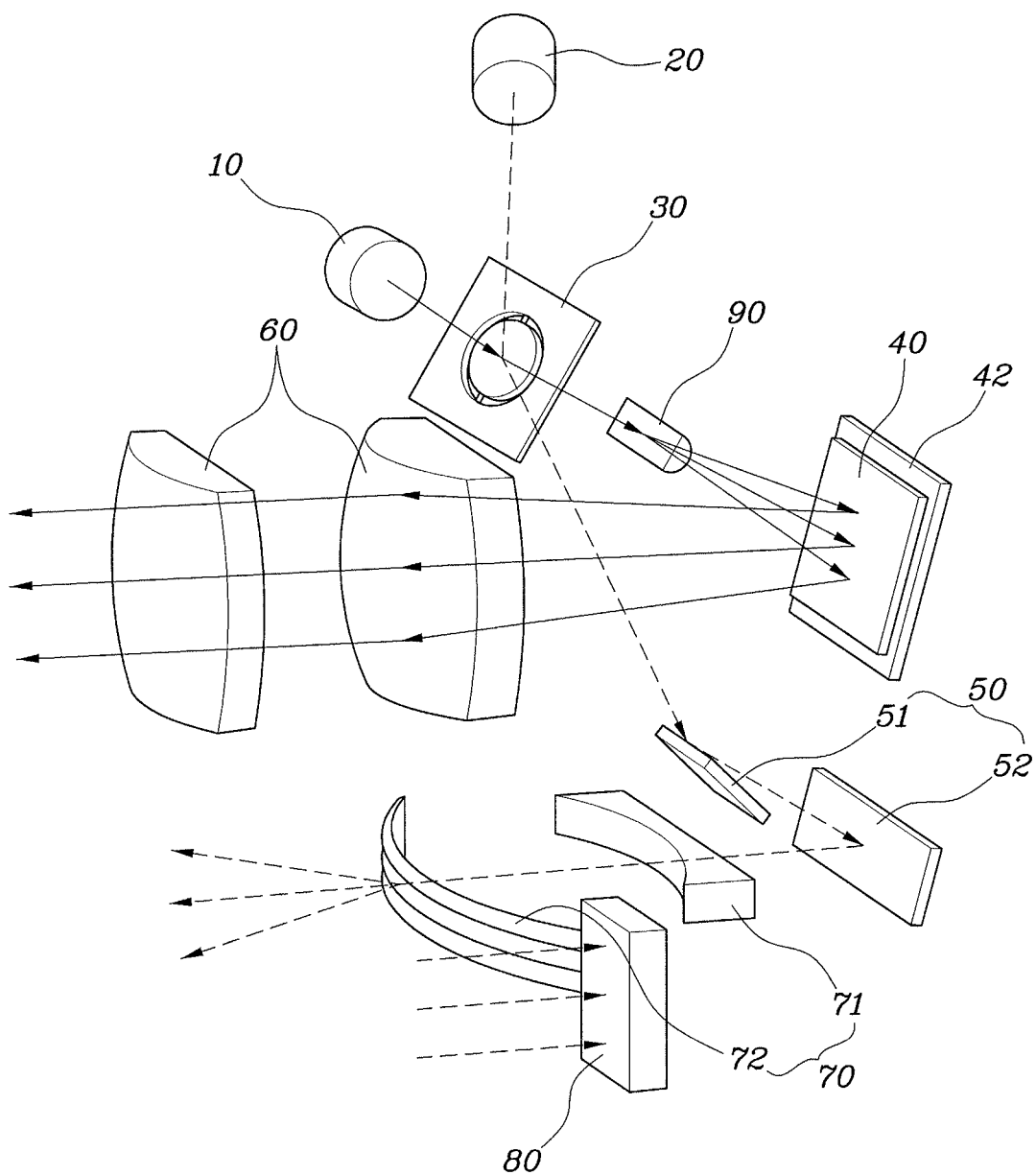
FIG. 1 is a view exemplarily illustrating a Light Detection and Ranging (LiDAR)-integrated lamp device configured for a vehicle according to an exemplary embodiment of the present invention.
Figure 2:
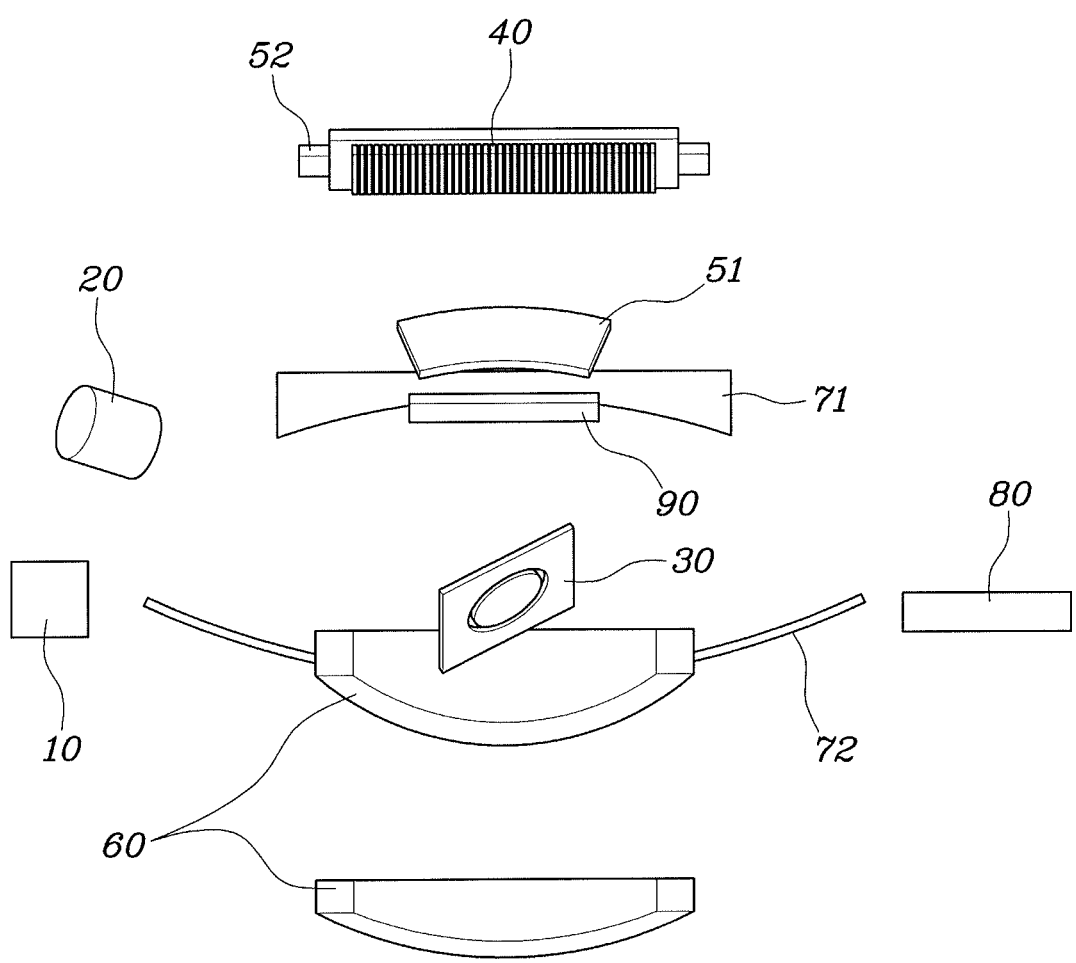
FIG. 2, FIG. 3, FIG. 4 and FIG. 5 are views explaining the LiDAR-integrated lamp device illustrated in FIG. 1.
Figure 3:
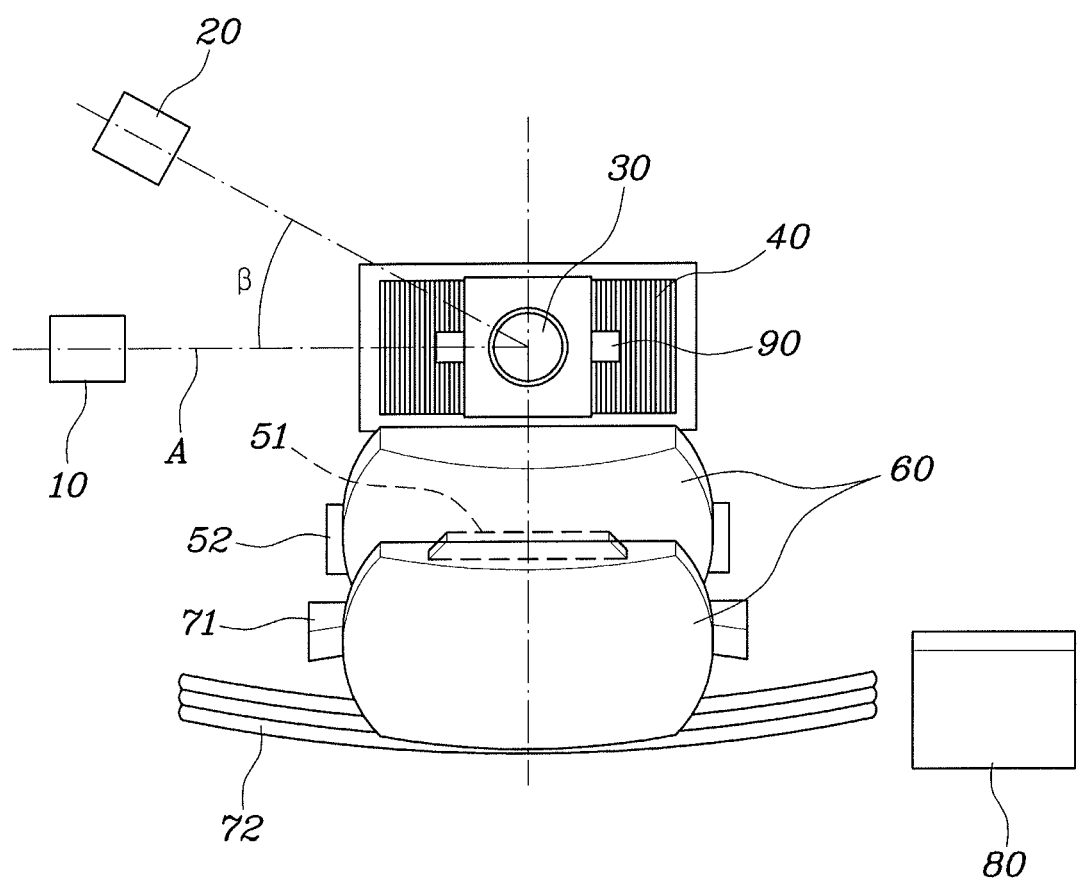

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention associated with a LiDAR-integrated lamp device configured for a vehicle, examples of which are illustrated in the accompanying drawings. Wherever possible, the same reference numbers will be used throughout the drawings to refer to the same or like parts.

Figure 6:
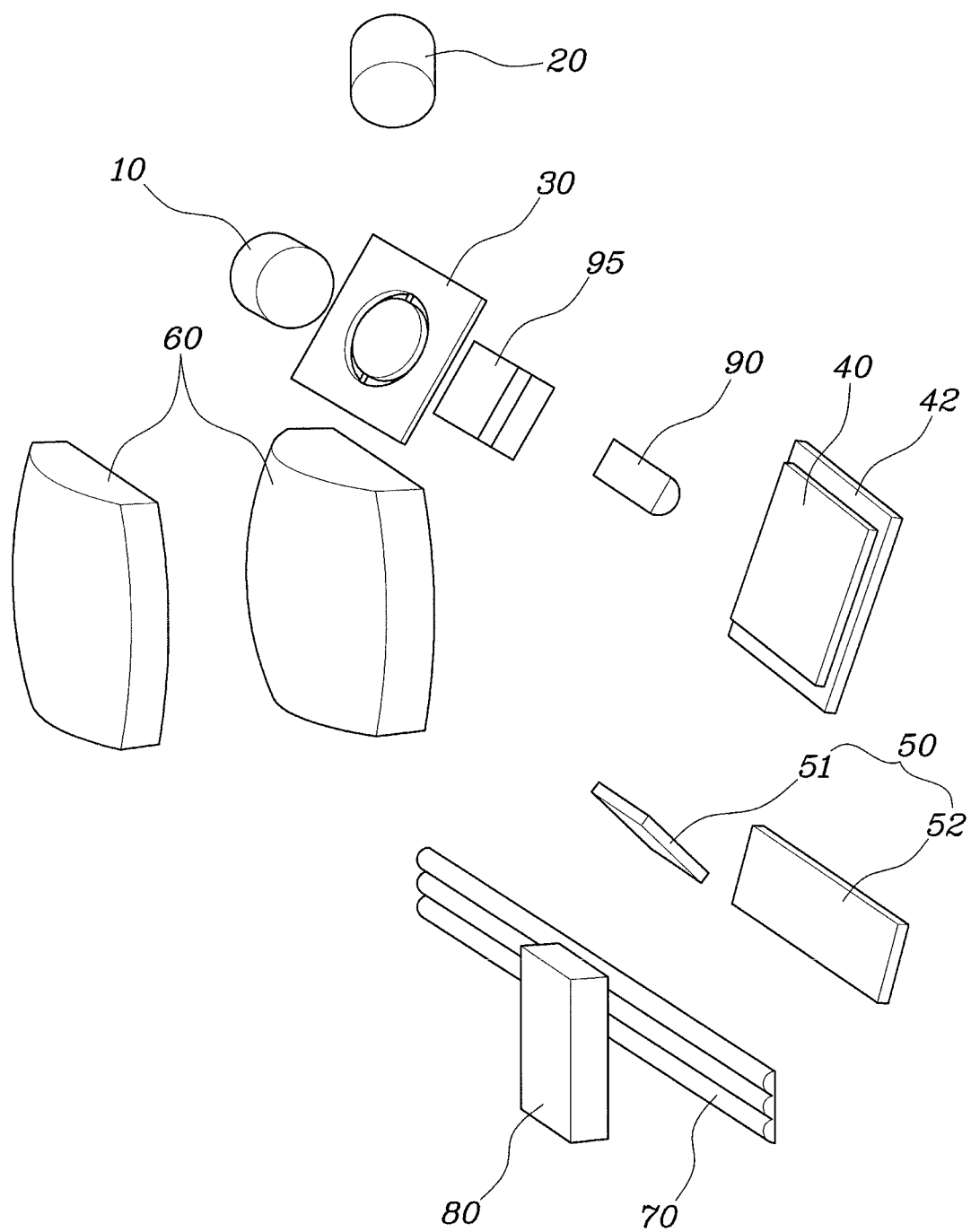
FIG. 6 is a view exemplarily illustrating a LiDAR-integrated lamp device configured for a vehicle according to various exemplary embodiments of the present invention.
Figure 7:
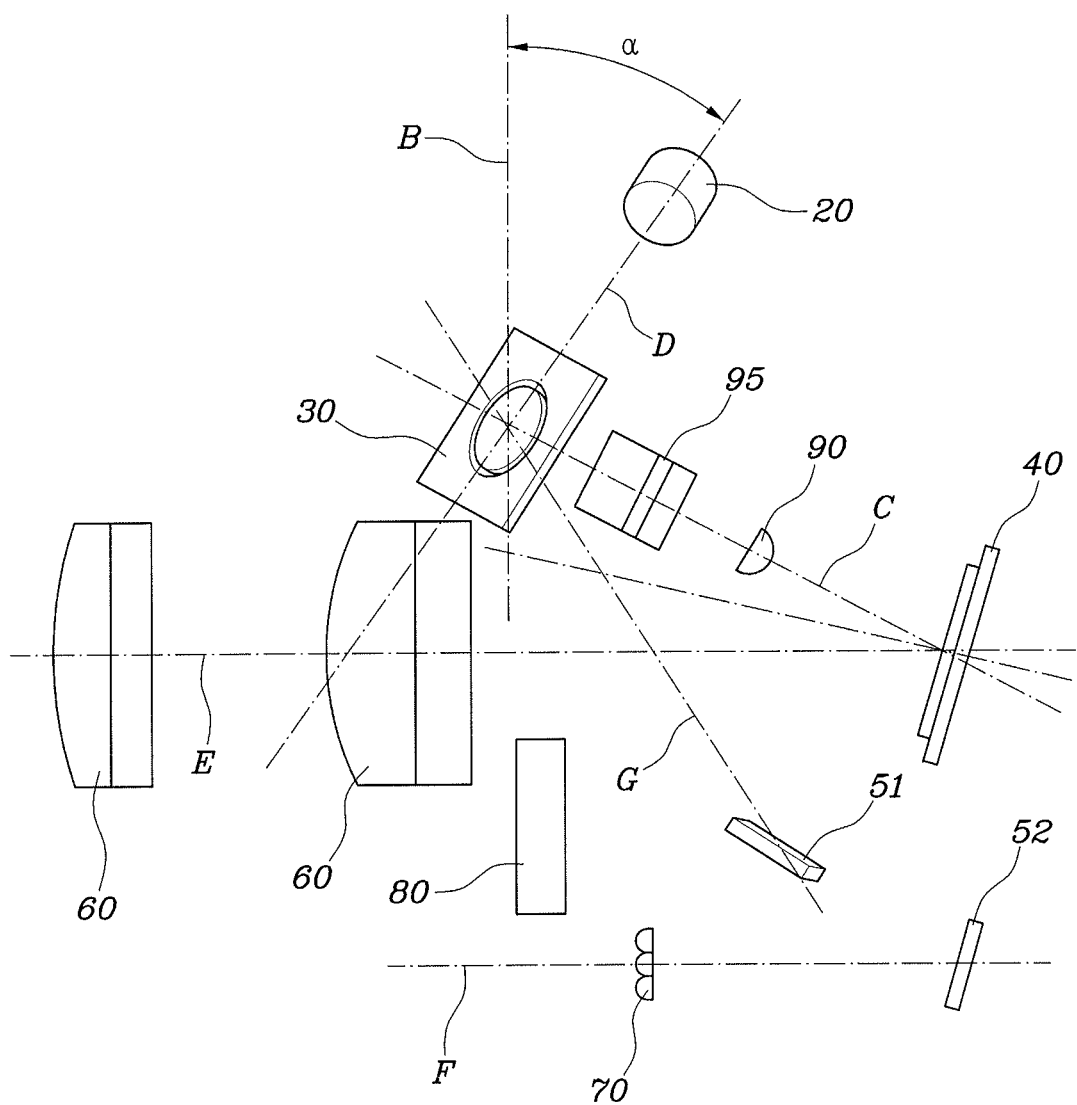
FIG. 7 is a view explaining the LiDAR-integrated lamp device illustrated in FIG. 6.

FIG. 1 is a view exemplarily illustrating a LiDAR-integrated lamp device configured for a vehicle according to an exemplary embodiment of the present invention. FIG. 2, FIG. 3, FIG. 4 and FIG. 5 are views explaining the LiDAR-integrated lamp device illustrated in FIG. 1. FIG. 6 is a view exemplarily illustrating a LiDAR-integrated lamp device configured for a vehicle according to various exemplary embodiments of the present invention. FIG. 7 is a view explaining the LiDAR-integrated lamp device illustrated in FIG. 6.

As illustrated in FIG. 1, FIG. 2, FIG. 3, and FIG. 4, the LiDAR-integrated lamp device according to the exemplary embodiment of the present invention includes a first light source 10 for emitting light for beam patterns; a second light source 20 spaced from the first light source 10, to emit light for LiDAR sensing; a reflection unit 30 for receiving the light for beam patterns from the first light source 10 and the light for LiDAR sensing from the second light source 20, and configured of varying reflection angles for the light for beam patterns and the light for LiDAR sensing, changing travel paths of the light for beam patterns and the light for LiDAR sensing; a first reflection mirror 40 for receiving the light for beam patterns reflected from the reflection unit 30, and changing the light for beam patterns into visible light while reflecting the light for beam patterns, emitting the visible light for beam patterns outwards of the vehicle; a second reflection mirror 50 for receiving the light for LiDAR sensing reflected from the reflection unit 30, and reflecting the light for LiDAR sensing, emitting the reflected light for LiDAR sensing outwards of the vehicle; a first optical system 60 for projecting the light for beam patterns reflected through the first reflection mirror 40 outwards of the vehicle; and a second optical system 70 for diffusing the light for LiDAR sensing reflected through the second reflection mirror 50 outwards of the vehicle. In the instant case, the LiDAR-integrated lamp device may further include a light receiving unit 80 for receiving light for LiDAR sensing reflected and returned after being emitted outwards of the vehicle, and changing the received light into an electrical signal.

As described above, the LiDAR-integrated lamp device according to the exemplary embodiment of the present invention may include the first light source 10, the second light source 20, the reflection unit 30, the first reflection mirror 40, the second reflection mirror 50, the first optical system 60 and the second optical system 70. All of the constituent elements are mounted in a single installation space, to realize both a head lamp function and a LiDAR function. That is, light for beam patterns emitted from the first light source 10 is projected outwards of the vehicle via the reflection unit 30, the first reflection mirror 40 and the first optical system 60, whereas light for LiDAR sensing emitted from the second light source 20 is emitted outwards of the vehicle via the reflection unit 30, the second reflection mirror 50 and the second optical system 70, is reflected by an object, to be returned, and is then input to the light receiving unit 80 and then, the distance between the vehicle and the object may be identified.

The first light source 10 emits laser light having a wavelength in a visible wavelength band recognizable with the naked eye and then, light for beam patterns may be visibly projected onto a road surface. On the other hand, the second light source 20 emits, as laser light, infrared light having a wavelength of 905 nm, that is, light for LiDAR sensing for detecting an object with reference to the vehicle.

The light for beam patterns emitted from the first light source 10 and the light for LiDAR sensing emitted from the second light source 20 are incident upon the reflection unit 30. In the instant case, the reflection unit 30 may be a digital micro-mirror device (DMD) having one or more mirrors each configured to vary an angle thereof through ON/OFF switching thereof according to a drive signal input thereto, changing a travel path of light incident thereupon. That is, the reflection unit 30 may change travel paths of light for beam patterns and light for LiDAR sensing by adjusting an angle of the mirror with reference to a central axis of the reflection unit 30 in accordance with ON/OFF switching. Adjustment of the mirror angle may be controlled by a controller. Accordingly, travel paths of the light for beam patterns emitted from the first light source 10 and the light for LiDAR sensing emitted from the second light source 20 may be changed in accordance with the mirror angle of the reflection unit 30.

Accordingly, the light for beam patterns from the first light source 10 reflected through the reflection unit 30 is emitted outwards of the vehicle after being changed in travel direction by the first reflection mirror 40, whereas the light for LiDAR sensing emitted from the second light source 20 is emitted outwards of the vehicle after being changed in travel direction by the second reflection mirror 50.

In the instant case, the light for beam patterns emitted from the first light source 10 is changed into visible light through the first reflection mirror 40 to illuminate a road surface, and is then projected outwards of the vehicle after passing through the first optical system 60. Furthermore, a diffusion unit 90 may be mounted between the reflection unit 30 and the first reflection mirror 40 to diffuse the light for beam patterns and then, the light for beam patterns may be distinctly projected onto a road surface. That is, the light for beam patterns emitted from the first light source 10 is diffused in a horizontal direction thereof, corresponding to an angle variation of the reflection unit 30, and is then diffused in a vertical direction by the diffusion unit 90, corresponding to a vertical length of the first reflection mirror 40. The light for beam patterns is changed to have a specific color through the first reflection mirror 40, is then changed to take the form of beam patterns through the first optical system 60, and is finally projected outwards of the vehicle.

In the instant case, the first reflection mirror 40 may include a fluorescent material. A heat dissipation plate 42 may be attached to the first reflection mirror 40 to dissipate heat generated due to light for beam patterns. In accordance with the above-described configurations, the first light source 10 may emit blue laser light as light for beam patterns, and the light for beam patterns emitted from the first light source 10 may be changed into white light when reflected after being incident upon the first reflection mirror 40 including a fluorescent material.

Figure 5:
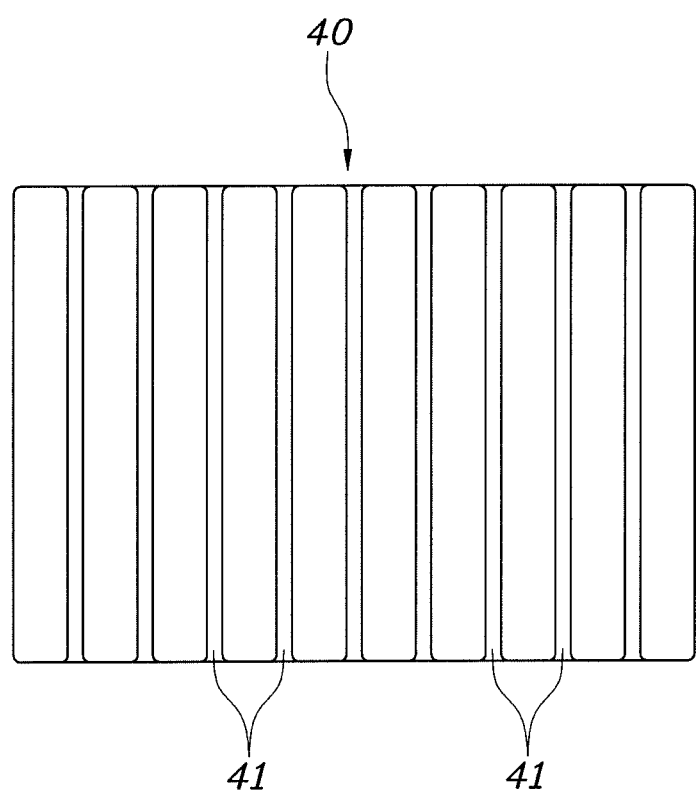

Furthermore, as illustrated in FIG. 5, plural opaque barriers 41 are mounted at a cross-section of the first reflection mirror 40, to extend linearly, while being spaced from one another. Blurring of light for beam patterns reflected by the first reflection mirror 40 may be restricted by the structure of the opaque barriers 41 and then, desired beam patterns may be formed.

Meanwhile, light for LiDAR sensing emitted from the second light source 20 is reflected by an object after traveling forwards of the vehicle via the second reflection mirror 50 and then, is returned. The light for LiDAR sensing returned after being reflected by the object is incident upon the light receiving unit 80 which, in turn, changes the incident light into an electrical signal. Based on the electrical signal, the distance between the vehicle and the object, etc. may be measured. The light receiving unit 80 may have a scanner for recognizing light for LiDAR sensing. In the instant case, the scanner may detect light for LiDAR sensing and change the detected light into an electrical signal, using a photodiode.

As apparent from the above description, in accordance with the exemplary embodiment of the present invention, a LiDAR is integrated with a head lamp within a head lamp installation space and then, a separate space for installation of the LiDAR may be eliminated, and a reduction in the number of constituent elements may also be achieved. As a result, manufacturing costs may be reduced.

Hereinafter, the LiDAR-integrated lamp device according to the exemplary embodiment of the present invention will be described in more detail. As illustrated in FIG. 1, the first light source 10 and the second light source 20 are mounted at one side of the reflection unit 30. The second light source 20 may be spaced from a connecting line A (FIG. 3) between the first light source 10 and the reflection unit 30 in an upward or downward direction thereof. As the first light source 10 and the second light source 20 are spaced from each other in the upward or downward direction thereof, travel paths of light for beam patterns and light for LiDAR sensing traveling through the reflection unit 30 may differ from each other. In the instant case, the distance between the first light source 10 and the second light source 20 may be set, taking into consideration interference between elements for guiding travel of the light for beam patterns and the light for LiDAR sensing.

Meanwhile, the reflection unit 30 is inclinedly mounted to guide light for beam patterns and light for LiDAR sensing incident thereupon to travel after being reflected upwards or downwards. When the second light source 20 is mounted above the first light source 10, the first reflection mirror 40 and the first optical system 60 may be mounted above the second reflection mirror 50 and the second optical system 70.

As the reflection unit 30 is inclinedly mounted, as described above, travel paths of light for beam patterns and light for LiDAR sensing may extend upwards or downwards. In an exemplary embodiment of the present invention, the inclination of the reflection unit 30 may be set such that light for beam patterns and light for LiDAR sensing reflected by the reflection unit 30 travel downwards. When the second light source 20 is mounted above the first light source 10, the reflection angle of light for LiDAR sensing may be increased and then, the second reflection mirror 50 and the second optical system 70 may be mounted below the first reflection mirror 40 and the first optical system 60.

Accordingly, although the light for beam patterns from the first light source 10 and the light for LiDAR sensing from the second light source 20 travel along different paths via the reflection unit 30, the light for beam patterns may be emitted outwards of the vehicle after being changed in travel path through the first reflection mirror 40, whereas the light for LiDAR sensing may be emitted outwards of the vehicle after being changed in travel path through the second reflection mirror 50.

In accordance with disposition of the first light source 10 and the second light source 20 at different vertical positions, corresponding ones of the first reflection mirror 40, the first optical system 60, the second reflection mirror 50 and the second optical system 70 may be mounted at opposite positions in a vertical direction thereof. Those skilled in the art will appreciate that disposition of these elements may be diversely improved and varied in the following embodiments.

Figure 4:
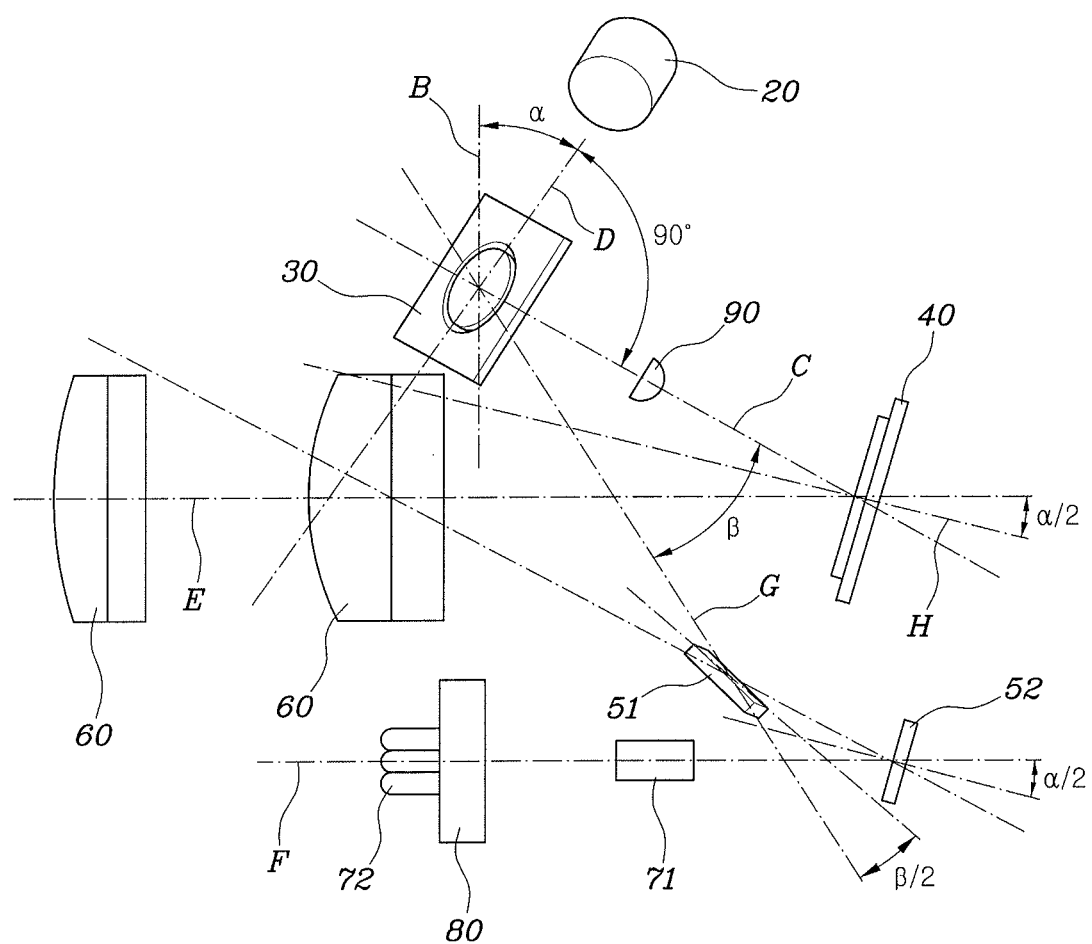

In detail, as illustrated in FIG. 4, the central axis of the reflection unit 30, which is designated by reference character "D", is inclined at a first angle α from a virtual vertical line B. The inclination direction of the central axis D may be set such that the light for beam patterns and the light for LiDAR sensing travel in a direction opposite to a direction in which the light for beam patterns and the light for LiDAR sensing are emitted outwards of the vehicle.

Accordingly, the inclination direction of the reflection unit 30 is set such that the light for beam patterns emitted from the first light source 10 and the light for LiDAR sensing emitted from the second light source 20 travel not only in a downward direction thereof, but also in a direction opposite to a direction in which the light for beam patterns and the light for LiDAR sensing are emitted outwards of the vehicle. Accordingly, the light for beam patterns is emitted outwards of the vehicle through the first optical system 60 after being changed in travel direction by the first reflection mirror 40. On the other hand, the light for LiDAR sensing is emitted outwards of the vehicle through the second optical system 70 after being changed in travel direction by the second reflection mirror 50. Since the reflection unit 30, the first reflection mirror 40 and the second reflection mirror 50 are mounted such that the light for beam patterns and the light for LiDAR sensing change travel directions thereof between forward and backward directions while traveling downwards, as described above, the overall layout is reduced.

In the instant case, the first reflection mirror 40 and the first optical system 60 may be mounted on a line E extending in a direction in which the light for beam patterns is emitted outwards of the vehicle. The first reflection mirror 40 may be mounted on an optical axis C extending in a direction in which the light for beam patterns emitted from the first light source 10 travels after being reflected by the reflection unit 30. The first reflection mirror 40 may be inclinedly mounted such that the light for beam patterns incident thereupon travels toward the first optical system 60.

In accordance with the above-described disposition, the light for beam patterns emitted from the first light source 10 may travel toward the first reflection mirror 40 after being reflected by the reflection unit 30, and may then be emitted outwards of the vehicle through the first optical system 60 after being changed in travel direction by the first reflection mirror 40.

In the instant case, the first reflection mirror 40 may be perpendicularly spaced from the central axis D of the reflection unit 30. The first reflection mirror 40 may also be mounted such that a line H perpendicular to the first reflection mirror 40 is inclined at an angle equal to ½ of the first angle α with respect to the line E of the first optical system 60. As the first reflection mirror 40 is perpendicularly spaced from the central axis D of the reflection unit 30, as described above, light for beam patterns traveling after being reflected by the reflection unit 30 may be incident upon the first reflection mirror 40. Furthermore, as the central axis D of the reflection unit 30 is inclined at the first angle α, the first reflection mirror 40 is inclined at an angle equal to ½ of the first angle α and then, light for beam patterns traveling after being reflected by the first reflection mirror 40 may travel along an optical axis extending in a forward direction toward the outside of the vehicle.

Meanwhile, the second light source 20 may be spaced from the connecting line A between the first light source 10 and the reflection unit 30 in an upward direction by a second angle β. As the first light source 10 and the second light source 20 are spaced from each other by the second angle β, as described above, travel paths of light for beam patterns and light for LiDAR sensing traveling through the reflection unit 30 may differ from each other.

In the instant case, the second reflection mirror 50 and the second optical system 70 may be mounted on a line F extending in a direction in which the light for LiDAR sensing is emitted outwards of the vehicle. The second reflection mirror 50 may be disposed on an optical axis G extending in a direction in which the light for LiDAR sensing emitted from the second light source 20 travels after being reflected by the reflection unit 30. The second reflection mirror 50 may be inclinedly disposed such that the light for LiDAR sensing incident thereupon travels toward the second optical system 70.

In accordance with the above-described disposition, the light for LiDAR sensing emitted from the second light source 20 may travel toward the second reflection mirror 50 after being reflected by the reflection unit 30, and may then be emitted outwards of the vehicle through the second optical system 70 after being changed in travel direction by the second reflection mirror 50.

In the instant case, the second reflection mirror 50 may include a first reflector 51 mounted to be downwardly spaced apart by the second angle β from the optical axis C of light for beam patterns traveling after being reflected by the reflection unit 30 while being inclined at an angle equal to ½ of the second angle β from the optical axis G of light for LiDAR sensing traveling after being reflected by the reflection unit 30, and a second reflector 52 mounted to receive the light for LiDAR sensing reflected by the first reflector 51 while being inclined at an angle equal to ½ of the first angle α with respect to the line F of the second reflection mirror 50 and the second optical system 70.

As the second reflection mirror 50 includes the first reflector 51 and the second reflector 52, and the first reflector 51 is inclined at an angle equal to ½ of the second angle β, as described above, the light for LiDAR sensing traveling after being reflected by the reflection unit 30 is primarily changed in travel direction thereof. Since the second reflector 52 is inclined at an angle equal to ½ of the first angle α, the light for LiDAR sensing may finally travel along an optical axis extending in a forward direction toward the outside of the vehicle.

As the first reflector 51 and the second reflector 52 have inclination angles set in accordance with the installation angle of the reflection unit 30 and the travel direction of the light for LiDAR sensing, respectively, the light for LiDAR sensing, which travels after being diagonally reflected, may be emitted outwards of the vehicle while changing the travel direction thereof to a horizontal direction thereof.

In the instant case, the first reflector 51 is formed to have a surface curved with respect to the central axis of the reflection unit 30. Accordingly, the first reflector 51 may accommodate a rotation radius of the reflection unit 30 for variation in reflection angle of the reflection unit 30 and then, the light for LiDAR sensing may travel to the second reflector 52 via the first reflector 51. As a result, degradation in luminous efficacy may be prevented.

As apparent from the above description, the travel direction of the light for LiDAR sensing according to the installation angle of the second light source 20 is adjusted to be directed to the outside of the vehicle in accordance with the installation angles of the first reflection mirror 40 and the second reflection mirror 50. Accordingly, the light for LiDAR sensing may surely travel to the outside of the vehicle and then, may effectively reach an object.

Meanwhile, the second optical system 70 may include a first diffusion lens 71 for horizontally diffusing light for LiDAR sensing traveling after being reflected by the second reflection mirror 50, and a second diffusion lens 72 for vertically diffusing the light for LiDAR sensing horizontally diffused by the first diffusion lens 71.

In the instant case, the first diffusion lens 71 may have a concave lens and then, may more widely horizontally diffuse light for LiDAR sensing horizontally expanded by the reflection unit 30. Furthermore, the second diffusion lens 72 may have a convex lens and then, may vertically diffuse the light for LiDAR sensing horizontally diffused by the first diffusion lens 71. As a result, the light for LiDAR sensing may be emitted outwards of the vehicle in a more widely diffused state and then, effective detecting of an object may be achieved.

In another exemplary embodiment of the LiDAR-integrated lamp device according to an exemplary embodiment of the present invention, as illustrated in FIG. 6 and FIG. 7, a condensing lens 95 is mounted between the reflection unit 30 and the diffusion unit 90. In the instant case, light for beam patterns emitted from the first light source 10 is horizontally expanded by the reflection unit 30, and is additionally horizontally expanded by the condensing lens 95. Thereafter, the light for beam patterns is vertically expanded by the diffusion unit 90 such that the light for beam patterns is matched with the area of the reflection unit 30. Furthermore, the second optical system 70 may have a single diffusion lens for vertically diffusing light for LiDAR sensing and then, the structure thereof may be simplified.

As apparent from the above description, in the LiDAR-integrated lamp device having the above-described configuration, the position at which a head lamp is applied and the position at which a LiDAR is applied are identical, being configured for achieving a reduction in layout. Furthermore, through sharing of constituent elements, it may be possible to reduce the number of constituent elements and then, manufacturing costs may be reduced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A Light Detection and Ranging (LiDAR)-integrated lamp device for a vehicle, the LiDAR-integrated lamp device including:
   a first light source of emitting light for beam patterns;
   a second light source spaced from the first light source and of emitting light for LiDAR sensing;
   a reflection unit of receiving the light for the beam patterns from the first light source and the light for the LiDAR sensing from the second light source, and configured of varying reflection angles for the light for the beam patterns and the light for the LiDAR sensing to change travel paths of the light for the beam patterns and the light for the LiDAR sensing;
   a first reflection mirror of receiving the light for the beam patterns reflected from the reflection unit, while reflecting the light for the beam patterns, and of emitting visible light for the beam patterns outwards of the vehicle;
   a second reflection mirror of receiving the light for the LiDAR sensing reflected from the reflection unit, of reflecting the light for the LiDAR sensing, and of emitting the reflected light for the LiDAR sensing outwards of the vehicle;
   a first optical system of projecting the light for the beam patterns reflected through the first reflection mirror outwards of the vehicle; and
   a second optical system for diffusing the light for the LiDAR sensing reflected through the second reflection mirror outwards of the vehicle,
   wherein the reflection unit has a central axis inclined at a first angle from a virtual vertical line,
   wherein the second light source is spaced from a connecting line connecting the first light source and the reflection unit by a second angle,
   wherein the second reflection mirror includes:
      a first reflector mounted to be downwardly spaced apart by the second angle from an optical axis of the light for the beam patterns traveling after being reflected by the reflection unit while being inclined at an angle equal to half of the second angle with respect to the light for the LiDAR sensing traveling after being reflected by the reflection unit; and
a second reflector mounted to receive the light for the LiDAR sensing reflected by the first reflector while being inclined at an angle equal to half of the first angle with respect to a first disposition line of the second reflection mirror and the second optical system.

2. The LiDAR-integrated lamp device according to claim 1, further including:
a light receiving unit of receiving the light for the LiDAR sensing reflected and returned after being emitted outwards of the vehicle, and of changing the received light for the LiDAR into an electrical signal.

3. The LiDAR-integrated lamp device according to claim 1,
wherein plural opaque barriers are mounted at a cross-section of the first reflection mirror and spaced from one another.

4. The LiDAR-integrated lamp device according to claim 1,
wherein the reflection unit is a digital micro-mirror device (DMD) including a plurality of micro-mirrors each configured to vary an angle thereof through ON/OFF switching thereof according to a drive signal input thereto, so as to change a travel path of light incident thereupon.

5. The LiDAR-integrated lamp device according to claim 1,
wherein the first light source and the second light source are mounted at a side of the reflection unit, and
wherein the second light source is spaced from the connecting line connecting the first light source and the reflection unit.

6. The LiDAR-integrated lamp device according to claim 5,
wherein the reflection unit is inclinedly mounted to guide the light for the beam patterns and the light for the LiDAR sensing incident thereupon to travel after being reflected.

7. The LiDAR-integrated lamp device according to claim 6,
wherein a connection line between the first reflection mirror and the first optical system is spaced from a connection line between the second reflection mirror and the second optical system.

8. The LiDAR-integrated lamp device according to claim 1,
wherein an inclination direction of the central axis is set so that the light for the beam patterns and the light for the LiDAR sensing travel in a direction opposite to a direction in which the light for the beam patterns and the light for the LiDAR sensing are emitted outwards of the vehicle.

9. The LiDAR-integrated lamp device according to claim 8,
wherein the first reflection mirror and the first optical system are mounted on a line extending in a direction in which the light for the beam patterns is emitted outwards of the vehicle; and
wherein the first reflection mirror is mounted on an optical axis extending in a direction in which the light for the beam patterns emitted from the first light source travels after being reflected by the reflection unit, and is inclinedly mounted such that the light for the beam patterns incident thereupon travels toward the first optical system.

10. The LiDAR-integrated lamp device according to claim 9,
wherein the first reflection mirror is spaced from the central axis of the reflection unit while being is inclined at an angle equal to half of the first angle with respect to a second disposition line of connecting the first reflection mirror and the first optical system.

11. The LiDAR-integrated lamp device according to claim 1,
wherein the second reflection mirror and the second optical system are mounted on a line extending in a direction in which the light for the LiDAR sensing is emitted outwards of the vehicle; and
wherein the second reflection mirror is mounted on an optical axis extending in a direction in which the light for the LiDAR sensing emitted from the second light source travels after being reflected by the reflection unit, and is inclinedly mounted such that the light for the LiDAR sensing incident thereupon travels toward the second optical system.

12. The LiDAR-integrated lamp device according to claim 1,
wherein the first reflector has a surface curved with respect to the central axis of the reflection unit.

13. The LiDAR-integrated lamp device according to claim 1, wherein the second optical system includes:
a first diffusion lens for horizontally diffusing the light for the LiDAR sensing traveling after being reflected by the second reflection mirror; and
a second diffusion lens for vertically diffusing the light for the LiDAR sensing horizontally diffused by the first diffusion lens.

14. The LiDAR-integrated lamp device according to claim 1,
wherein the first reflection mirror includes a heat dissipation plate attached to a surface of the first reflection mirror.

15. The LiDAR-integrated lamp device according to claim 1, wherein a diffusion unit is mounted between the reflection unit and the first reflection mirror, to diffuse the light for the beam patterns.

* * * * *